(12) United States Patent
Xie et al.

(10) Patent No.: US 10,156,924 B2
(45) Date of Patent: Dec. 18, 2018

(54) METAL GRID, TOUCH SCREEN DISPLAY DEVICE AND A MANUFACTURE METHOD FOR TOUCH SCREEN

(71) Applicants: Boe Technology Group Co., Ltd., Beijing (CN); Hefei Xinsheng Optoelectronics Technology Co., Ltd., Anhui (CN)

(72) Inventors: Xiaodong Xie, Beijing (CN); Ming Hu, Beijing (CN); Zhizhong Tu, Beijing (CN); Ming Zhang, Beijing (CN); Qingpu Wang, Beijing (CN); Kefeng Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 14/785,125

(22) PCT Filed: Apr. 30, 2015

(86) PCT No.: PCT/CN2015/077945
§ 371 (c)(1),
(2) Date: Oct. 16, 2015

(87) PCT Pub. No.: WO2016/086583
PCT Pub. Date: Jun. 9, 2016

(65) Prior Publication Data
US 2016/0357303 A1 Dec. 8, 2016

(30) Foreign Application Priority Data
Dec. 4, 2014 (CN) .......................... 2014 1 0735309

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ....... G02F 1/13338; G06F 2203/04112; G06F 2203/04111; G06F 3/044; G06F 2203/04103
See application file for complete search history.

(56) References Cited

U.S. PATENT DOCUMENTS

2011/0018838 A1 1/2011 Lee
2011/0310037 A1* 12/2011 Moran .................. G06F 3/0412
345/173

(Continued)

FOREIGN PATENT DOCUMENTS

| CN | 102708946 | 10/2012 |
| CN | 102722279 | 10/2012 |

(Continued)

OTHER PUBLICATIONS

International Search Report and Written Opinion from PCT/CN2015/077945 dated Aug. 26, 2015.

(Continued)

*Primary Examiner* — Robert Michaud
(74) *Attorney, Agent, or Firm* — Calfee, Halter & Griswold LLP (57) ABSTRACT

The embodiments of the invention provide a metal grid, a touch screen, a display device and a manufacture method of touch screen, and refer to display technology field. The invention can improve the phenomenon of moiré fringe when the line width of the metal wire is relatively large. The (Continued)

metal grid comprises multiple repeat units, the metal wires in the repeat unit form at least two different kinds of basic patterns, and the repeat unit is pieced together by one or more of the at least two different kinds of basic patterns.

16 Claims, 4 Drawing Sheets

(52) U.S. Cl.
CPC ............ *G06F 2203/04103* (2013.01); *G06F 2203/04111* (2013.01); *G06F 2203/04112* (2013.01)

(56) References Cited

U.S. PATENT DOCUMENTS

| | | | |
|---|---|---|---|
| 2012/0318585 A1 | 12/2012 | Kim et al. | |
| 2013/0299222 A1 | 11/2013 | Lee et al. | |
| 2014/0083742 A1 | 3/2014 | Gao et al. | |
| 2014/0111709 A1* | 4/2014 | Kim | G02F 1/13338 349/12 |
| 2014/0218642 A1* | 8/2014 | Iwami | G06F 3/044 349/12 |
| 2016/0092004 A1 | 3/2016 | Yoshiki | |
| 2016/0246405 A1 | 8/2016 | Hu et al. | |
| 2017/0031482 A1* | 2/2017 | Yoshiki | G06F 3/041 |

FOREIGN PATENT DOCUMENTS

| | | |
|---|---|---|
| CN | 102723126 A | 10/2012 |
| CN | 103777810 | 5/2014 |
| CN | 103955320 | 7/2014 |
| CN | 103955320 A | 7/2014 |
| CN | 104123037 | 10/2014 |
| CN | 204087163 | 1/2015 |
| CN | 104375710 | 2/2015 |
| CN | 204331661 | 5/2015 |
| EP | 2662758 A2 | 11/2013 |
| EP | 2725463 A2 | 4/2014 |
| TW | M481453 | 7/2014 |
| WO | 2014185388 A1 | 11/2014 |

OTHER PUBLICATIONS

Office action from Chinese Application No. 201410735309.5 dated Nov. 4, 2016.
Second Office Action for Chinese Patent Application No. 201410735309.5 dated Jun. 14, 2017.
Search Report from European Patent Application No. 15790434.3 dated Aug. 27, 2018.

* cited by examiner

METAL GRID, TOUCH SCREEN DISPLAY DEVICE AND A MANUFACTURE METHOD FOR TOUCH SCREEN

RELATED APPLICATIONS

The present application is the U.S. national phase entry of PCT/CN2015/077945, with an international filing date of Apr. 30, 2015, which claims the benefit of Chinese Patent Application No. 201410735309.5, filed Dec. 4, 2014, the entire disclosures of which are incorporated herein by reference.

TECHNICAL FIELD

The invention refers to a technical field of display, and specifically to a metal grid, touch screen, display device and a manufacture method for touch screen.

BACKGROUND

For improving user experience effect of display device, touch screen has been applied in the display device broadly. Specifically, the touch screen comprises touch electrodes for sensing touch position. Normally, a metal grid with lower resistance is used for touch electrode, for reducing the delay of the resistance and capacitance, and improving signal transmitting rate of the touch electrode.

Currently, the touch electrode applied in the OGS touch screen is generally a regular metal grid. The metal grid comprises multiple metal wires extending along a first direction, which are equally spaced and parallel to each other, and multiple metal wires extending along a second direction intersecting the first direction, which are equally spaced and parallel to each other. Since the metal grid has the above structure and is light-tight, and the black matrix in the display module is a grid structure and light-tight also, after bonding the touch screen and the display module, a phenomenon of line overlapping between the metal grid and black matrix occurs generally, making the light emitted by the display module generate corrugated interference fringe (i.e. moiré fringe) after passing through the metal grid, which reduces display quality of the display device.

In the prior art, a way of reducing line width of the metal wire is used normally to improve the phenomenon of moiré fringe, for example, reducing the line width of the metal wire to 3.5 µm. However, the inventor found that, when the line width of the metal wire is small, issues such as metal wire breakage and poor antistatic capacity etc. may easily occur.

SUMMARY

The technical problem to be solved by the invention is providing a metal grid, a touch screen, a display device and a manufacture method of touch screen, which can improve the phenomenon of moiré fringe when the line width of the metal wire is relatively large.

For resolving the above technical problem, an embodiment of the invention provides a metal grid for touch screen, which employs the following technical solution:

The metal grid comprises multiple repeat units, the metal wires in the repeat unit form at least two different kinds of basic patterns, and the repeat unit is pieced together by one or more of the at least two different kinds of basic patterns.

According to a preferred embodiment, the basic patterns in the repeat unit are arranged irregularly.

According to a preferred embodiment, the metal wires are straight wires or curved wires.

According to a preferred embodiment, the metal wires are straight wires, and the angle between the adjacent metal wires is 30°, 45°, 60°, 90°, 135° or 180°.

According to a preferred embodiment, the basic patterns formed by the metal wires in the repeat unit comprise at least two of a square pattern, a non-square parallelogram pattern, an isosceles right triangle pattern and a non-isosceles right triangle pattern.

According to a preferred embodiment, the basic patterns formed by the metal wires in the repeat unit comprise: a square pattern, a first non-rectangular parallelogram pattern inclining to a first direction, and a second non-rectangular parallelogram pattern inclining to a second direction, the first direction being opposite to the second direction.

According to a preferred embodiment, the basic patterns formed by the metal wires in the repeat unit comprise: a square pattern, an isosceles right triangle pattern and a non-isosceles right triangle pattern.

According to a preferred embodiment, the basic patterns formed by the metal wires in the repeat unit are arranged to have ten rows, therein the first, fourth, seventh and tenth rows all comprise a square pattern; the second, third, eighth and ninth rows all comprise a isosceles right triangle pattern; the fifth and sixth rows both comprise a non-isosceles right triangle pattern.

According to a preferred embodiment, two adjacent basic patterns in the repeat unit are basic patterns of different kinds.

According to a preferred embodiment, the line width of the metal wire is 5-10 micron.

An embodiment of the invention provides a metal grid, which comprises multiple repeat units, the metal wires in the repeat unit form at least two different kinds of basic patterns, and the repeat unit is pieced together by one or more of the at least two different kinds of basic patterns, so that when the metal grid having the above structure is used as the touch electrode in the touch screen, the line overlapping phenomenon between the metal grid and the black matrix in the display module can be improved after bonding the touch screen and the display module. This can in turn improve the phenomenon of moiré fringe even if the line width of the metal wire is relatively large, so as to avoid the issues such as the metal wire breakage and poor antistatic capability etc. occurring.

Further, an embodiment of the invention also provides a touch screen, which employs the following technical solution:

A touch screen, comprising a substrate and touch electrodes arranged as an array on the substrate, each touch electrode comprising the above metal grid.

According to a preferred embodiment, two adjacent touch electrodes in the same row are connected through the metal grid situated at the same layer with the touch electrodes, and two adjacent touch electrodes in the same column are connected through a cross-bridge; alternatively, two adjacent touch electrodes in the same column are connected through the metal grid situated at the same layer with the touch electrodes, and two adjacent touch electrodes in the same row are connected through a cross-bridge; alternatively, two adjacent touch electrodes in the same row are connected through a cross-bridge, and two adjacent touch electrodes in the same column are connected through a cross-bridge.

According to a preferred embodiment, the touch screen further comprises a blanking layer under a layer at which the touch electrodes in the middle area of the touch screen are situated, a shading layer under a layer at which the touch electrodes in the peripheral area of the touch screen are situated, and a protection layer on a layer at which the touch electrodes are situated, the protection layer is provided with via holes through which two ends of the cross-bridge connect to a touch electrode respectively.

According a preferred embodiment, only the protection layers above two adjacent touch electrodes situated in a same row and/or column are each provided with one via hole, and two ends of the cross-bridge connect to a touch electrode through the two via holes respectively; alternatively, the protection layers above two adjacent touch electrodes situated in a same row and/or column are provided with one via hole, which extends from one touch electrode to another touch electrode adjacent to and in the same row or column with the one touch electrode along a direction parallel to the substrate.

According a preferred embodiment, the material of the cross-bridge is indium tin oxide.

According a preferred embodiment, the touch screen further comprises binding wires at the peripheral area, which binding wires are at the same layer and have same material with the touch electrodes.

According a preferred embodiment, the touch screen further comprises protection lines for binding wires on the binding wires, which protection lines for binding wires are at the same layer and have same material with the cross-bridge.

An embodiment of the invention provides a touch screen comprising a substrate and touch electrodes arranged as an array on the substrate, metal grid included in the touch electrodes has multiple repeat unit, the metal wires in the repeat unit form at least two different kinds of basic patterns, and the repeat unit is pieced together by one or more of the at least two different kinds of basic patterns, so that the line overlapping phenomenon between the metal grid and the black matrix in the display module can be improved after bonding the touch screen and the display module. This can in turn improve the phenomenon of moiré fringe even if the line width of the metal wire is relatively large, so as to avoid the issues such as the metal wire breakage and poor antistatic capability etc. occurring.

Besides, an embodiment of the invention further provides a display device comprising the above touch screen.

Besides, an embodiment of the invention further provides a manufacture method for touch screen, which comprises: forming a pattern including a shading layer on a substrate; above the substrate on which the pattern including a shading layer is formed, forming a pattern including the blanking layer; above the substrate on which the pattern including the blanking layer is formed, forming a pattern including a metal grid used for touch electrodes, a metal grid used for connecting two adjacent touch electrodes and binding wires, the metal grid used for touch electrodes comprises multiple having multiple repeat unit, the metal wires in the repeat unit forming at least two different kinds of basic patterns, and the repeat unit being pieced together by one or more of the at least two different kinds of basic patterns; above the substrate on which the pattern including the metal grid used for touch electrodes and the binding wires is formed, forming a pattern including a protection layer; above the substrate on which the pattern including the protection layer is formed, forming a pattern including cross-bridges and protection lines for the binding wires.

BRIEF DESCRIPTION OF FIGURES

For more clearly illustrate the embodiments of the invention or the technical solutions on the prior art, the figures needed for used in the description of the embodiments will be introduced briefly below. Apparently, the figures in the following description are only some embodiments of the invention. For those ordinary skilled in the art, other figures can be obtained also from these figures without expending creative effort.

LIST OF REFERENCE SIGNS

1—repeat unit; 2—metal wire; 3—substrate;
4—touch electrode; 5—cross-bridge; 6—blanking layer;
7—shading layer; 8—protection layer; 9—via hole;
10—binding wire; 11—protection line for binding wire.

DETAIL EMBODIMENTS

The technical solutions in the embodiments of the invention will be described clearly and completely below in conjunction with the figures in the embodiments of the invention. Apparently, the embodiments described are only part of the embodiments of the invention, rather than all of the embodiments. All other embodiments obtained by those ordinary skilled in the art based on the embodiments of the invention without expending creative effort are within the protection scope of the invention.

Embodiment 1

An embodiment of the invention provides a metal grid, which can improve the phenomenon of moiré fringe when the line width of the metal wire in the metal gird is relatively large.

As shown in FIGS. 1-4, the metal grid comprises multiple repeat units 1, the metal wires 2 in the repeat unit 1 form at least two different kinds of basic patterns, and the repeat unit 1 is pieced together by one or more of the at least two different kinds of basic patterns, so that when the metal grid having the above structure is used as the touch electrodes in the touch screen, the line overlapping phenomenon between the metal grid and the black matrix in the display module can be improved after bonding the touch screen and the display module. This can in turn improve the phenomenon of moiré fringe even if the line width of the metal wire 2 is relatively large, so as to avoid the issues such as the metal wire 2 breakage and poor antistatic capability etc. occurring.

Exemplarily, the basic patterns in the repeat unit 1 are arranged irregularly. It should be noted that the "irregularly arranging" means having no smaller repeat unit and nonperiodically arranging or randomly arranging. Exemplarily, the metal wires 2 can be straight wires or curved wires. When the metal wires 2 are straight wires, the angle between the adjacent metal wires is 30°, 45°, 60°, 90°, 135° or 180°. At this time, the patterns formed by the metal wires 2 in the repeat unit 1 comprise at least two of a square pattern, a non-square parallelogram pattern, an isosceles right triangle pattern and a non-isosceles right triangle pattern. It should be noted that, the above "non-square parallelogram pattern" refers to a parallelogram pattern the four angles of which are not right angles; the above "non-isosceles right triangle pattern" refers to a right triangle pattern the right-angle sides of which are not equal to each other.

Figure 1:
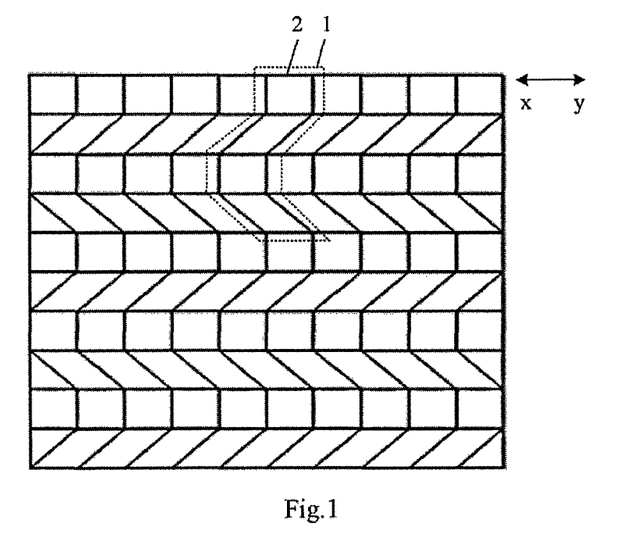
FIG. 1 is a schematic view of a first kind of metal grid in an embodiment of the invention.
Figure 2:
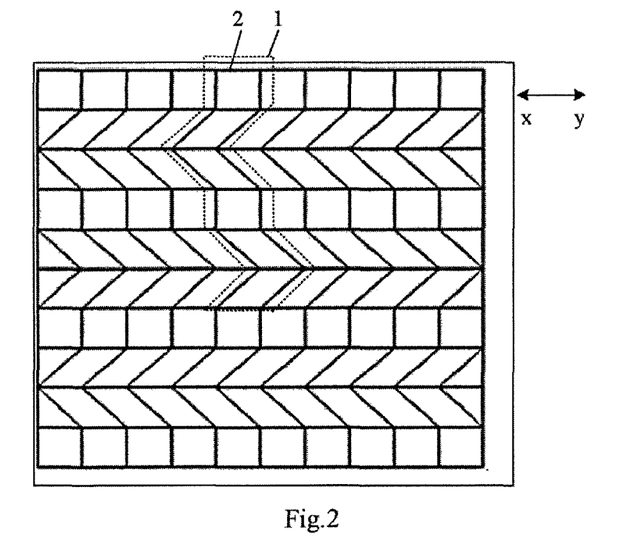
FIG. 2 is a schematic view of a second kind of metal grid in an embodiment of the invention.
Figure 3:
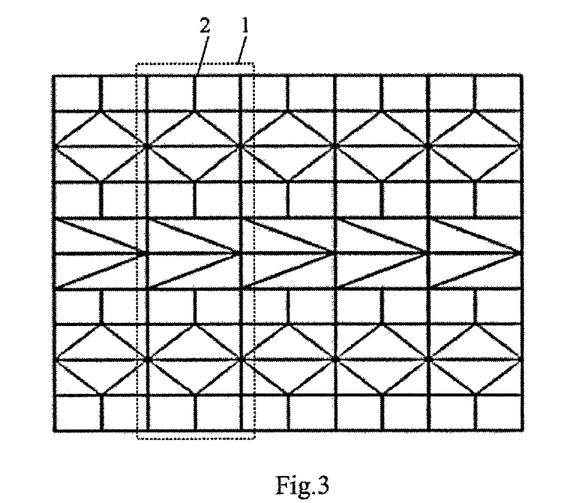
FIG. 3 is a schematic view of a third kind of metal grid in an embodiment of the invention.
Figure 4:
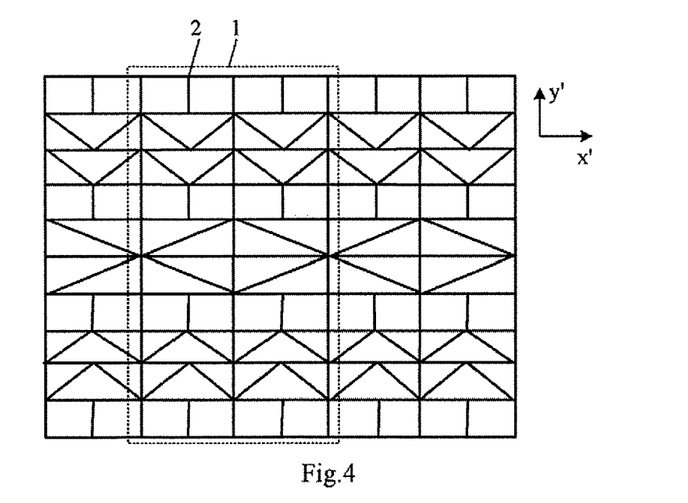
FIG. 4 is a schematic view of a fourth kind of metal grid in an embodiment of the invention.

For facilitating the understanding of those skilled in the art, the embodiments of the invention provide four kinds of specific metal grids as shown in FIGS. 1-4. Therein, as shown in FIGS. 1 and 2, the basic patterns pieced together in the repeat unit 1 comprise: a square pattern, a first non-rectangular parallelogram pattern inclining to a first direction x, and a second non-rectangular parallelogram pattern inclining to a second direction y, the first direction x being opposite to the second direction y. it can be seen from FIGS. 1 and 2, any two adjacent basic patterns in the repeat unit are of different kinds. As shown in FIGS. 3 and 4, the basic patterns pieced together in the repeat unit 1 comprise: a square pattern, an isosceles right triangle pattern and a non-isosceles right triangle pattern; the basic patterns formed by the metal wires 2 in the repeat unit 1 are distributed in ten rows, and the first, fourth, seventh and tenth rows all comprise a square pattern; the second, third, eighth and ninth rows all comprise a isosceles right triangle pattern; the fifth and sixth rows both comprise a non-isosceles right triangle pattern. It can be seen from FIGS. 3 and 4, the repeat unit has a rectangle outline pieced together.

The specific structures of the four kinds of metal grids as shown in FIGS. 1-4 will be described in detail below.

In the first kind of structure, as shown in FIG. 1, the basic patterns pieced together in the repeat unit 1 of the metal grid comprise: a first square pattern, a first non-rectangular parallelogram pattern inclining to a first direction with one side abutting one side of the first square pattern, a second square pattern with one side abutting another side of the first non-rectangular parallelogram pattern which is opposite to the first square pattern, and a second non-rectangular parallelogram pattern inclining to a second direction y with one side abutting another side of the second square pattern which is opposite to the first non-rectangular parallelogram pattern, the first direction x being opposite to the second direction y.

In the second structure, as shown in FIG. 2, the basic patterns pieced together in the repeat unit 1 comprise: a first square pattern, a first non-rectangular parallelogram pattern inclining to a first direction x with one side abutting one side of the first square pattern, a second non-rectangular parallelogram pattern inclining to a second direction y with one side abutting another side of the first non-rectangular parallelogram pattern which is opposite to the first square pattern, a second square pattern with one side abutting another side of the second non-rectangular parallelogram pattern which is opposite to the first non-rectangular parallelogram pattern, a third non-rectangular parallelogram pattern inclining to the second direction y with one side abutting another side of the second square pattern which is opposite to the second non-rectangular parallelogram pattern, and a fourth non-rectangular parallelogram pattern inclining to the first direction x with one side abutting another side of the third non-rectangular parallelogram pattern which is opposite to the second square pattern; the first direction x is opposite to the second direction y.

In the third structure, as shown in FIG. 3, the overall outline of the repeat unit 1 is a rectangle. The first row in the basic patterns pieced together in the repeat unit 1 comprises two first square patterns; the second row comprises a first isosceles right triangle pattern with a vertex angle oriented towards the first row, and two second isosceles right triangle pattern with the base side being two legs of the first isosceles right triangle pattern; the patterns comprised in the third and fourth rows are axial symmetry to the patterns comprised in the second and first rows respectively; the fifth row comprises two non-isosceles right angle patterns with a common hypotenuse; the patterns comprised in the sixth, seventh, eighth, ninth and tenth rows are axial symmetry to the patterns comprised in the fifth, fourth, third, second and first rows respectively.

In the fourth structure, as shown in FIG. 4, the repeat unit 1 comprises a first portion and a second portion with rectangle outlines; therein, the first row of the patterns formed by the metal wires 2 in the first portion comprise two first square patterns; the second row comprises a first isosceles right triangle pattern with a vertex angle oriented towards the first row, and two second isosceles right triangle pattern with the base side being two legs of the first isosceles right triangle pattern; the patterns comprised in the third row are the same with the patterns comprised in the second row; the patterns comprised in the fourth row are the same with the patterns comprised in the first row; the fifth row comprises two non-isosceles right triangle patterns with a common hypotenuse; the patterns comprised in the sixth, seventh, eighth, ninth and tenth rows are axial symmetry to the patterns comprised in the fifth, fourth, third, second and first rows along a third direction x' respectively; the patterns formed by the metal wires 2 in the second portion are axial symmetry to the patterns formed by the metal wires 2 in the first portion along a fourth direction y'; the third direction x' is vertical to the fourth direction y'.

It should be noted that, the specific structures of the metal grid in the embodiments of the invention are not limited to the above kinds, and it is unnecessary to go into details.

Besides, the line width of the metal wire 2 in the metal grid in the embodiments of the invention is 5-10 micron. To be able to improve the phenomenon of moiré fringe to the greatest extent, the line width of the metal wire 2 in the metal grid in the embodiments of the invention is preferably 5 micron.

The embodiment of the invention provides a metal grid, which comprises multiple repeat unit, the metal wires in the repeat unit form at least two different kinds of basic patterns, and the repeat unit is pieced together by one or more of the at least two different kinds of basic patterns, so that when the metal grid having the above structure is used as the touch electrodes in the touch screen, the line overlapping phenomenon between the metal grid and the black matrix in the display module can be improved after bonding the touch screen and the display module. This can in turn improve the phenomenon of moiré fringe even if the line width of the metal wire is relatively large, so as to avoid the issues such as the metal wire breakage and poor antistatic capability etc. occurring.

Embodiment 2

Figure 5:
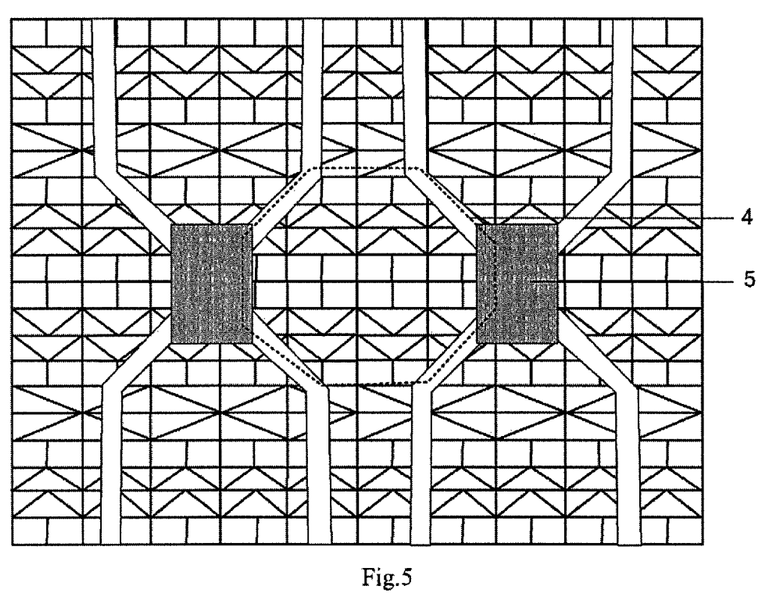
FIG. 5 is a plane schematic view of a middle area of a touch screen in an embodiment of the invention.

The embodiment of the invention provides a touch screen, as shown in FIG. 5, the touch screen comprises a substrate 3 and touch electrodes 4 arranged as an array on the substrate 3, each touch electrode 4 comprises the metal grid described in embodiment 1. It can be known from the description of embodiment 1, the metal grid has multiple repeat unit 1, the metal wires 2 in the repeat unit 1 form at least two different kinds of basic patterns, and the repeat unit 1 is pieced together by one or more of the at least two different kinds of basic patterns, so that the line overlapping phenomenon between the metal grid and the black matrix in the display module can be improved after bonding the touch screen and the display module. This can in turn improve the phenomenon of moiré fringe even if the line width of the metal wire 2 is relatively large, so as to avoid the issues such as the metal wire 2 breakage and poor antistatic capability etc. occurring.

Further, in order to realize signal transmission, two adjacent touch electrodes 4 in the same row in the embodiment of the invention are connected through the metal grid situated at the same layer with the touch electrodes 4, and two adjacent touch electrodes 4 in the same column are connected through a cross-bridge 5; alternatively, two adjacent touch electrodes 4 in the same column are connected through the metal grid situated at the same layer with the touch electrodes 4, and two adjacent touch electrodes in the same row 4 are connected through a cross-bridge 5; alternatively, two adjacent touch electrodes 4 in the same row are connected through a cross-bridge 5, and two adjacent touch electrodes 4 in the same column are connected through a cross-bridge 5. Exemplarily, as shown in FIG. 5, the touch electrodes 4 at the same column constitute a Rx channel, and the two adjacent touch electrodes in the Rx channel are connected through a cross-bridge 5, and the touch electrodes 4 at the same row constitute a Tx channel, and the two adjacent touch electrodes 4 in the Tx channel are connected through a metal gird at the same layer with the touch electrodes 4.

Preferably, the touch screen further comprises a blanking layer, a shading layer, a protection layer and via holes in the protection layer. Specifically, as shown in FIGS. 6 and 7, the blanking layer 6 is under the layer at which the touch electrodes 4 in the middle area of the touch screen are situated; as shown in FIG. 8, the shading layer 7 is under the layer at which the touch electrodes 4 in the peripheral area of the touch screen are situated; as shown in FIGS. 6, 7 and 8, the protection layer 8 is on the layer at which the touch electrodes 4 are situated, and as shown in FIGS. 6 and 7, via holes 9 are provided in the protection layer 8, and two ends of the cross-bridge 5 connect to one touch electrode 4 respectively through the via holes 9.

Therein, the function of the blanking layer 6 is reducing the vision visibility of the metal grids used as the touch electrodes 4, and the material of the blanking layer 6 may be silicon dioxide or niobium pentoxide, etc.; the function of the shading layer 7 is preventing light leakage of the peripheral area of the touch screen, and the material thereof may be black resin material etc.; the function of the protection layer 8 is protecting the metal wires 2 in the metal grids used as the touch electrodes 4 from being oxidized, and making the metal grid or cross-bridges 5 for connecting adjacent touch electrodes 4 insulated from each other, and the material thereof may be transparent resin material etc.

Figure 6:
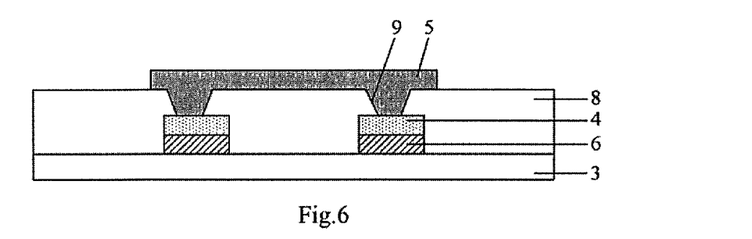
FIG. 6 is a section schematic view of a first kind of middle area of a touch screen in an embodiment of the invention.
Figure 7:
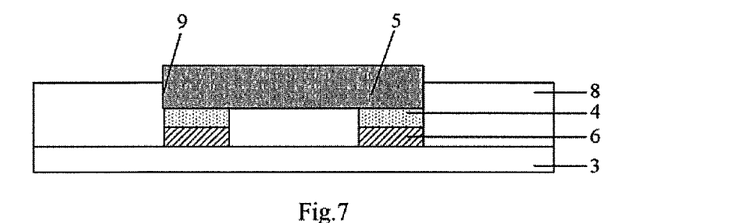
FIG. 7 is a section schematic view of a second kind of middle area of a touch screen in an embodiment of the invention.
Figure 8:
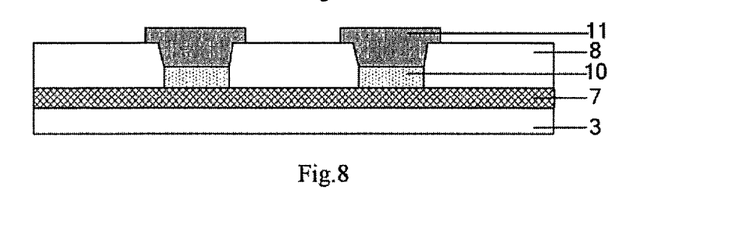
FIG. 8 is a section schematic view of a peripheral area of a touch screen in an embodiment of the invention.

It should be noted that, the arrangement of the via holes may employ the following two ways: in the first way, as shown in FIG. 6, only the protection layers 8 above two adjacent touch electrodes 4 situated in a same row and/or column are each provided with one via hole 9, and two ends of the cross-bridge 5 connect to a touch electrode through the two via hole 9 respectively; in the second way, as shown in FIG. 7, the protection layers 8 above two adjacent touch electrodes 4 situated in a same row and/or column are provided with one via hole 9, which extends from one touch electrode 4 to another touch electrode 4 adjacent to and in the same row or column with the one touch electrode 4 along a direction parallel to the substrate 3.

Further, the material of the cross-bridge 5 in the embodiment of the invention is preferably indium tin oxide, so as to make the cross-bridge 5 not be able to be seen by the user while have good conductivity.

Further, as shown in FIG. 8, the touch screen further comprises binding wires 10 at the peripheral area, which binding wires 10 are at the same layer and have the same material with the touch electrodes 4, so as not to increase complexity of the manufacture progress of the touch screen. Specifically, one end of a binding wire 10 connects to a row or column of touch electrodes 4, and the other end connects to a flexible circuit board, so as to transmit the sensing signal generated in the touch electrodes 4 to the integrated circuit through the flexible circuit board. Since the binding wires 10 and the touch electrodes 4 are at the same layer and have the same material, and the material of the binding wires 10 is metal, for preventing the binding wires 10 from being oxidized or etched, the touch screen in the embodiment of the invention preferably further comprises protection lines 11 for the binding wires on the binding wires 10. The protection lines 11 for the binding wires and the cross-bridges 5 are at the same layer and have the same material, so that the material of the protection lines 11 for the binding wires is indium tin oxide with good resistance effect to oxidization and corrosion, and the complexity of the manufacture progress of the touch screen would not be increased.

The embodiment of the invention provides a touch screen comprising a substrate and touch electrodes arranged as an array on the substrate, metal grid included in the touch electrodes has multiple repeat unit, the metal wires in the repeat unit form at least two different kinds of basic patterns, and the repeat unit is pieced together by one or more of the at least two different kinds of basic patterns, so that the line overlapping phenomenon between the metal grid and the black matrix in the display module can be improved after bonding the touch screen and the display module. This can in turn improve the phenomenon of moiré fringe even if the line width of the metal wire is relatively large, so as to avoid the issues such as the metal wire breakage and poor antistatic capability etc. occurring.

Besides, the embodiment of the invention further provides a display device comprising the above touch screen. Specifically, the display device may be a liquid panel, an electronic paper, an organic light emitting display panel, a cell phone, a tablet computer, a television, a displayer, a notebook computer, a digital photo frame, a navigator, and any other products or components with display function.

Figure 9:
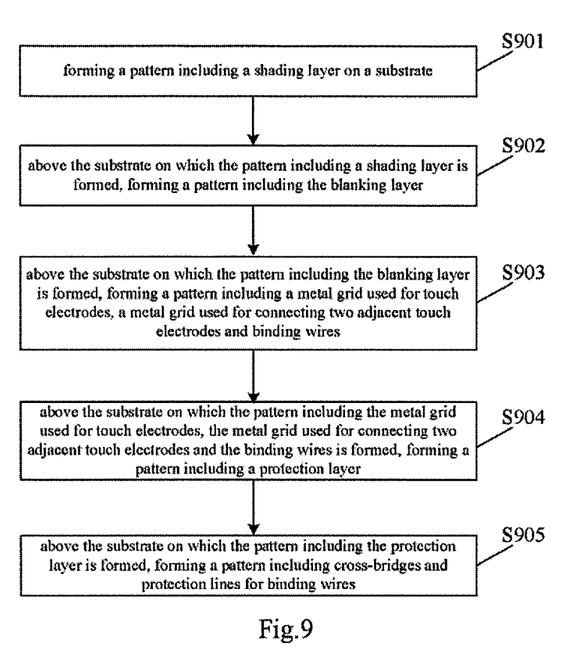
FIG. 9 is a manufacture flowchart of a touch screen in an embodiment of the invention.

For facilitating those skilled in the art making the touch screen described in the embodiments of the invention, an embodiment of the invention further provides a manufacture method for the above touch screen, as shown in FIG. 9, which manufacture method comprises:

Step S901, forming a pattern including a shading layer on a substrate.

Specifically, forming a layer of black resin material on the substrate, and forming a pattern including the shading layer after exposure and developing processes.

Step S902, above the substrate on which the pattern including a shading layer is formed, forming a pattern including a blanking layer.

Specifically, forming a layer of a material for forming the blanking layer on the substrate on which the pattern including a shading layer is formed, and coating a layer of photo resist on the layer of the material, and forming a layer including a blanking layer after exposure, developing and etching processes.

Step S903, above the substrate on which the pattern including the blanking layer is formed, forming a pattern including a metal grid used for touch electrodes, a metal grid used for connecting two adjacent touch electrodes and binding wires.

Specifically, above the substrate on which the pattern including the blanking layer is formed, forming a layer of metal, and coating a layer of photo resist on the layer of metal, and forming a pattern including a metal grid used for touch electrodes, a metal grid used for connecting two adjacent touch electrodes and binding wires, after the exposure, developing and etching processes.

Step S904, above the substrate on which the pattern including the metal grid used for touch electrodes and the binding wires is formed, forming a pattern including a protection layer.

Specifically, above the substrate on which the pattern including the metal grid used for touch electrodes, a metal grid used for connecting two adjacent touch electrodes and the binding wires is formed, forming a layer of transparent resin material, and forming a pattern including the protection layer after the exposure and developing processes. It should be noted that, the protection layer can broadly cover the whole substrate, with via holes only at the connection positions of the cross-bridges and the touch electrodes, or there is a protection layer only above the metal grid used as the conducting channel.

Step S905, above the substrate on which the pattern including the protection layer is formed, forming a pattern including cross-bridges and protection lines for the binding wires.

Specifically, above the substrate on which the pattern including the protection layer is formed, forming a layer of indium tin oxide, and then coating a layer of photo resist on the indium tin oxide, and forming a pattern including cross-bridges and protection lines for the binding wires after the exposure, developing and etching processes.

It should be noted that, the manufacture method for the touch screen provided by the embodiment of the invention is not limited to this, and those skilled in the art can change it according to the specific structure of the above touch screen.

The above is only the specific implementation of the invention, and the protection scope of the invention is not limited to this. Within the technical scope disclosed by the invention, those skilled in the art can easily think of alterations or substitutions, which should be included in the protection scope of the invention. Therefore, the protection scope of the invention should only be defined by the protection scope of the claims.

The invention claimed is:

1. A metal grid for touch electrodes in a touch screen, the metal grid comprising:
    multiple repeat units arranged without spacing between each other;
        wherein the multiple repeat units comprise at least two different kinds of closed basic patterns having outer boundaries enclosed by metal wires in the multiple repeat units;
        wherein each of the multiple repeat units is pieced together by the at least two different kinds of closed basic patterns;
        wherein in each of the multiple repeat units, the basic patterns are arranged irregularly and any two adjacent basic patterns are different kinds of basic patterns; and
        wherein in each of the at least two different kinds of closed basic patterns there are no metal wires except the metal wires enclosing the outer boundaries of the basic pattern.

2. The metal grid of claim 1 wherein the metal wires comprise one of straight wires and curved wires.

3. The metal grid of claim 1 wherein the metal wires comprise straight wires, and wherein the angle between adjacent metal wires is 30°, 45°, 60°, 90°, 135°, or 180°.

4. The metal grid of claim 1 wherein the at least two different kinds of closed basic patterns comprise at least two of a square pattern, a non-square parallelogram pattern, an isosceles right triangle pattern and a non-isosceles right triangle pattern.

5. The metal grid of claim 1 wherein the at least two different kinds of closed basic patterns comprise:
    a square pattern;
    a first non-rectangular parallelogram pattern inclining to a first direction; and
    a second non-rectangular parallelogram pattern inclining to a second direction wherein the first direction is opposite to the second direction.

6. The metal grid of claim 1 wherein the at least two different kinds of closed basic patterns comprise:
    a square pattern;
    an isosceles right triangle pattern; and
    a non-isosceles right triangle pattern;
    wherein at least one of the multiple repeat units comprises a first row, a second row, a third row, a fourth row, a fifth row, a sixth row, a seventh row, an eighth row, a ninth row, and a tenth row;
    wherein the first row, fourth row, seventh row, and tenth row comprise a square pattern;
    wherein the second row, third row, eighth row, and ninth row comprise an isosceles right triangle pattern;
    wherein the fifth and sixth rows comprise a non-isosceles right triangle pattern.

7. The metal grid of claim 1 wherein the metal wire comprises a line width of 5 micron to 10 micron.

8. A touch screen comprising:
    a substrate; and
    touch electrodes;
    wherein the touch electrodes are arranged as an array on the substrate;
    wherein each of the touch electrodes comprise a metal grid, the metal grid comprising:
        multiple repeat units arranged without spacing between each other;
            wherein the multiple repeat units comprise at least two different kinds of closed basic patterns having outer boundaries enclosed by metal wires in the multiple repeat units;
            wherein each of the multiple repeat units is pieced together by the at least two different kinds of closed basic patterns;
            wherein in each of the multiple repeat units, the basic patterns are arranged irregularly and any two adjacent basic patterns are different kinds of basic patterns; and wherein in each of the at least two different kinds of closed basic patterns there are no metal wires except the metal wires enclosing the outer boundaries of the basic pattern.

9. The touch screen of claim 8 wherein the touch electrodes are arranged in rows and columns;
wherein one of:
two adjacent touch electrodes in the same row are connected through the metal grid situated at a same layer with the touch electrodes and two adjacent touch electrodes in the same column are connected through a cross-bridge; or
two adjacent touch electrodes in the same column are connected through the metal grid situated at a same layer with the touch electrodes and two adjacent touch electrodes in the same row are connected through a cross-bridge; or
two adjacent touch electrodes in the same row are connected through a cross-bridge and two adjacent touch electrodes in the same column are connected through a cross-bridge.

10. The touch screen of claim 9 further comprising:
a blanking layer under a layer at which the touch electrodes in a middle are of the touch screen are situated;
a shading layer under a layer at which the touch electrodes in a peripheral area of the touch screen are situated; and
a protection layer on a layer at which the touch electrodes are situated;
wherein the protection layer is provided with holes through which two ends of the cross-bridge connect to the touch electrodes.

11. The touch screen of claim 10 wherein at least one of:
only the protection layers above two adjacent touch electrodes situated in at least one of the rows and the columns are each provided with one hole and two ends of the cross-bridge connect to the two adjacent touch electrodes through each of the one holes; or
the protection layers above two adjacent touch electrodes situated in at least one of the rows and the columns are provided with one hole that extends from one of the two adjacent touch electrodes to another of the two adjacent touch electrodes in the same at least one of the rows and the columns, and one of the two adjacent touch electrodes is along a direction parallel to the substrate.

12. The touch screen of claim 9 wherein the cross-bridge is made of indium tin oxide.

13. The touch screen of claim 12 further comprising binding wires at a peripheral area wherein the binding wires are at a same layer and have a same material as the touch electrodes.

14. The touch screen of claim 13 wherein the binding wires comprise protection lines;
wherein the protection lines are located in a same layer and have a same material as the cross-bridge;
wherein the lines are made of the same material as the cross-bridge.

15. A display device comprising the touch screen of claim 8.

16. A manufacture method for a touch screen comprising:
forming a pattern comprising a shading area on a substrate;
forming a pattern comprising a blanking area, wherein the pattern comprising the blanking area is formed above the substrate on which the pattern comprising the shading area is formed;
forming a pattern comprising a metal grid;
wherein the pattern comprising the metal grid is formed above the substrate on which the pattern comprising the blanking area is formed;
wherein the metal grid is used for connecting two adjacent touch electrodes and binding wire;
wherein the metal grid comprises multiple repeat units arranged without spacing between each other;
wherein the multiple repeat units comprise at least two different kinds of closed basic patterns having outer boundaries enclosed by metal wires in the multiple repeat units;
wherein each of the multiple repeat units is pieced together by the at least two different kinds of closed basic patterns;
wherein in each of the multiple repeat units, the basic patterns are arranged irregularly and any two adjacent basic patterns are different kinds of basic patterns;
wherein in each of the at least two different kinds of closed basic patterns there are no metal wires except the metal wires enclosing the outer boundaries of the basic pattern;
forming a pattern comprising a protection layer; and
wherein the pattern comprising the protection layer is formed above the substrate on which the pattern comprising the metal grid is formed;
forming a pattern comprising cross-bridges and protection lines for the binding wires wherein the pattern comprising the cross-bridges and the protection lines for the binding wires is formed above the substrate on which the pattern comprising the protection layer is formed.

* * * * *